United States Patent [19]

Veigel

[11] 4,288,184
[45] Sep. 8, 1981

[54] BORING TOOL

[75] Inventor: Helmut Veigel, Schwieberdingen, Fed. Rep. of Germany

[73] Assignee: Komet Stahlhalter- und Werkzeugfabrik Robert Breuning GmbH, Besigheim, Fed. Rep. of Germany

[21] Appl. No.: 114,939

[22] Filed: Jan. 24, 1980

[30] Foreign Application Priority Data

Feb. 22, 1979 [DE] Fed. Rep. of Germany ... 7904992[U]

[51] Int. Cl.³ .............................................. B23B 29/02
[52] U.S. Cl. ...................................... 408/185; 407/76; 407/88; 407/101
[58] Field of Search .................. 408/185, 181, 239 R; 407/76, 88, 101, 45, 46, 37

[56] References Cited

U.S. PATENT DOCUMENTS

| 654,436 | 7/1900 | Burnham | 407/37 |
| 3,296,897 | 1/1967 | Konwal | 408/181 |
| 3,410,160 | 11/1968 | Le Barre | 407/76 |
| 4,163,624 | 8/1979 | Eckle | 408/185 |

FOREIGN PATENT DOCUMENTS

| 885335 | 8/1953 | Fed. Rep. of Germany | 408/181 |
| 2343542 | 1/1977 | France | 408/188 |

Primary Examiner—Leonidas Vlachos
Attorney, Agent, or Firm—Blanchard, Flynn, Thiel, Boutell & Tanis

[57] ABSTRACT

The shaft (1) of the drilling tool has a support (3) fixed in a cylindrical blind hole (2) by means of a fixing screw (10). The support has a rear cylindrical portion (3a) and a forward half-cylindrical portion (3b). The forward portion has a replaceable cutting insert (4) fixed in it by means of a clamping screw (8). This is screwed into a first thread (9) of the support, and this thread extends perpendicularly to the seating (5) provided for the replaceable cutting insert. The support has a second thread (9) running parallel to the first thread and this locates the fixing screw which is screwed into the support from below passing through an oblong hole (11) in the shaft. The base (2a) of the blind hole is provided with an adjusting screw (12) which is arranged so as to be displaced from its axil. The adjusting screw has a cylindrical centring shoulder (14) which is a snug fit in a hole (16) provided in the shaft (1) and adjoining the centring shoulder is provided at its forward end with a cylindrical spigot (15), the diameter of which is smaller than that of the centring shoulder, and this is a snug fit in a recess (17) provided in the cylindrical portion (3a) of the support (3). (Main Figure: FIG. 1).

5 Claims, 3 Drawing Figures

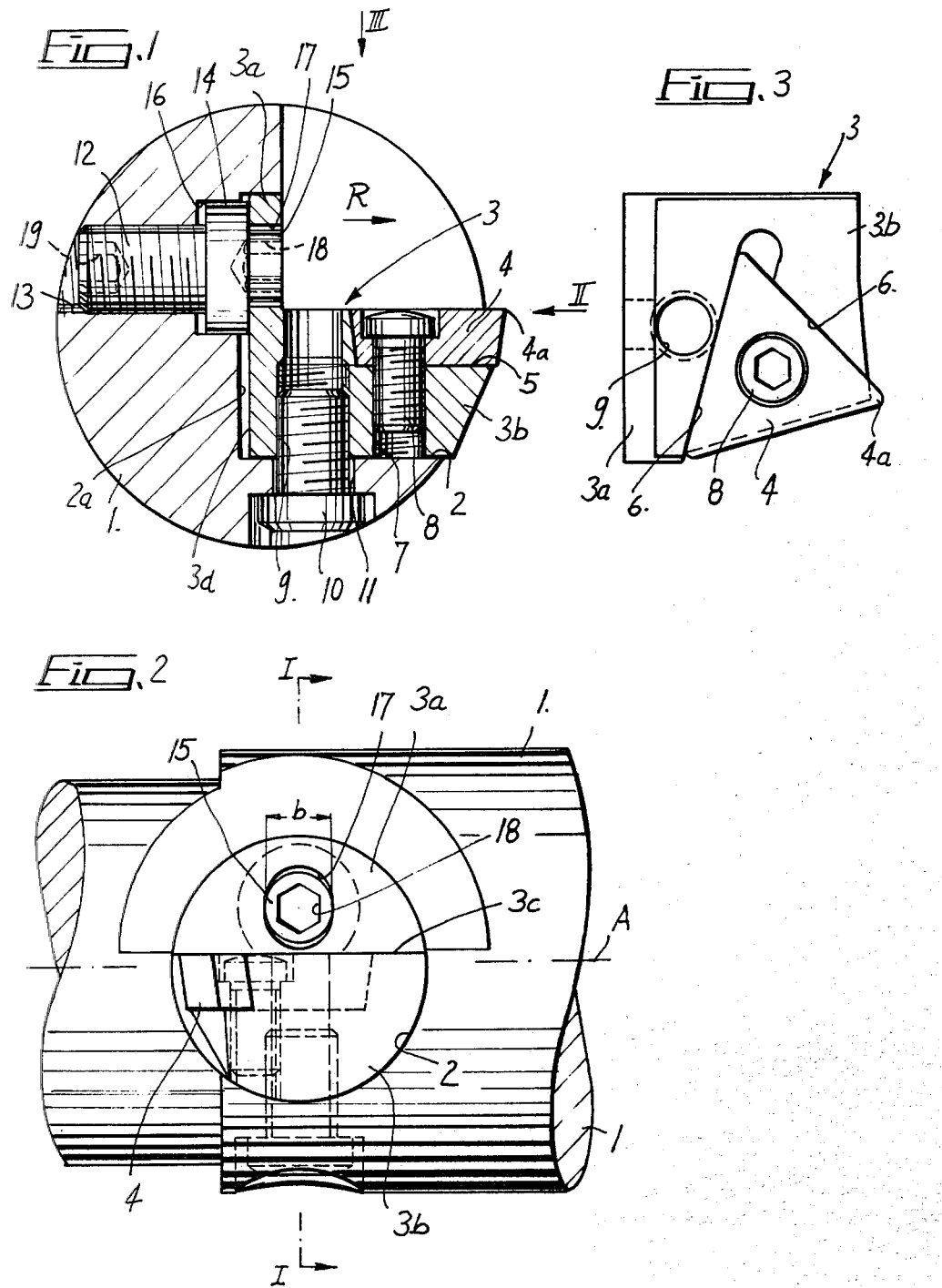

BORING TOOL

The invention relates to a boring tool having a shaft and at least one support which is inserted in a cylindrical blind hole in the shaft and is attached by means of a fixing screw, the support being provided with a rear cylindrical portion with a circular cross-section adapted to fit in the blind hole and, adjoining this, a forward approximately half-cylindrical portion with an essentially semi-circular cross-section of the same diameter, the half-cylindrical forward portion having a recess for a replaceable cutting insert, through which a clamping screw passes, the recess having a seating which is parallel to the top surface of the insert which passes approximately along a diameter of the shaft and abutment surfaces for the replaceable cutting insert, and in which a thread for the clamping screw is arranged perpendicularly to the seating.

In a known boring tool of this type (see West German Offenlegungsschrift No. 26 09 617) the cylindrical portion of the support has, in the region extending beyond the replaceable cutting insert, a passage which extends parallel to the axis of the support.

A fixing screw engages in this passage, and is screwed into a threaded hole provided in the base of the blind hole. This ensures that the support is rigidly and firmly attached to the boring tool, or, for example, to a bor bar. One main advantage of this known boring tool resides in the fact that it is only necessary to provide a fairly easy to produce blind hole in the shaft for receiving the support. In order to meet greater demands for accuracy here, it is desirable to provide for subsequent radial adjustment of the support. The provision of adjustment in the radial sense is also important when it is desired to use the boring tool in conjunction with NC-machines, in which case the degree of radial adjustments only need amount to a few tenths of a millimeter.

The invention has the aim of providing a boring tool of the type mentioned above, in which the support carrying the replaceable cutting insert can subsequently be adjusted with respect to the axis of the shaft along the axis of the blind hole using simple means and which despite this, is securely held in the blind hole.

According to the invention this is achieved by providing the support with a second thread arranged parallel to the first thread for the clamping screw, the second thread receiving a fixing screw which is screwed from below through an oblong hole in the shaft into the support, and by providing an adjusting screw in the base of the blind hole which is arranged to be parallel to and displaced from the axis of the blind hole, the adjusting screw having a cylindrical centring shoulder which is a snug fit in a passage in the shaft and, adjoining the centring shoulder, a cylindrical spigot at its forward end which is smaller in diameter than the centring shoulder and is a snug fit in a recess of the cylindrical portion of the support and by providing in the rear and/or front end(s) of the adjusting screw a depression to allow engagements of an adjusting tool.

Using the new boring tool exact adjustment of the support carrying the replaceable cutting insert in the radial sense with respect to the shaft can be carried out very simply. In order to carry this out, it is only necessary to slacken the fixing screw and then to carry out precise adjustment by rotating the adjusting screw using an adjusting tool, for example a hexagonal key. When this is being done the centring shoulder bears against the rear end of the support. When the desired adjustment has been performed, it is only necessary to tighten the fixing screw. The fixing screw urges the half-cylindrical portion of the support firmly against the wall of the blind hole so that the support is securely fastened to the shaft. The forces occuring during machining are additionally securely transferred to the shaft in a dual manner. Firstly, the adjusting screw provides an abutment to prevent axial displacement of the support in the blind hole. The adjusting screw also, however, takes up forces operating in the peripheral direction of the blind hole. The forces concerned here are the main cutting forces operating on the replaceable insert. These are not only transferred to the shaft by means of the fixing screw referred to above, but are also additionally transferred by the adjusting screw, where both the spigot is an exact fit in the cylindrical portion of the support and where the centring shoulder is a snug fit in the passage provided in the shaft. Using this arrangement all cutting forces are securely transferred to the shaft and a particularly high degree of safety against shearing of the fixing screw is provided. At the same time, the boring tool according to the invention has a particular advantage residing in the fact that in order to locate the support in the shaft, which for example is a boring bar, only holes are needed which are very easy to produce. As a result of this, it is even possible for the user of such boring tools to produce these holes himself. Only the support and the adjusting screw needs to be manufactured using suitable specialized machinery in a tool room suitable equipped to provide these. Since however these can, independently of the final form and constructions of the boring tools, be manufactured in large quanties it is possible to reduce the overall manufacturing cost for boring tools of this type. Due to its reduced dimensions, the support also requires little space in order to accommodate it. It is for example possible to install the support in a boring bar having a diameter of only 15 mm, so that it can be used to produce bores of as little as 16 mm size upwards. Due to its reduced dimensions, only minimal weakening of the section occurs when the blind hole necessary for accommodating the support is produced in the case of this boring tool, which for example is a boring bar.

Further advantageous refinements to the invention are given in the sub claims.

The invention is described in greater detail below with with reference to one embodiment which is shown in the drawing.

In these:

FIG. 1 is a cross-sectional view of the boring tool according to the invention taken along line I—I of FIG. 2.

FIG. 2 shows a view taken in the direction II of FIG. 1.

FIG. 3 is a plan view of the support and replaceable cutting insert taken in the direction III of FIG. 1.

In the drawing, reference numerals I indicates the cylindrical shaft of the boring tool, in which for example, this boring tool may be a boring bar. The shaft 1 is provided with a blind hole 2 running perpendicularly to its axis A and this receives the support 3. The support 3 has a rearward cylindrical portion 3a with a circular cross-section fitting into the blind hole which is followed by a forward approximately half-cylindrical portion 3b having an essentially semi-circular cross-section of the same diameter. The half-cylindrical portion 3b is provided with a recess for a replaceable cutting insert 4.

This recess has a seating 5, which runs parallel to the top surface 3c of the portion 3b of the support. The recess is also provided with abutment surfaces 6 provided for the sides of the replaceable cutting insert 4. In the embodiment shown, the replaceable cutting insert has a triangular shape. It is also of course possible to make use of a replaceable cutting insert having any other desired number of sides, for example having a rectangular or even a hexagonal shape, in which case the abutment surfaces 6 are suitable adapted for this shape. The portion 3b of the support is further provided with a thread 7 which runs perpendicularly to the seating 5 and this receives a clamping screw 8 which passes through the replaceable cutting insert 4.

In order to provide for location of the support 3 in the blind hole 2 provided in the shaft 1, the support is provided with a second thread 9 which runs parallel to the first thread 7. This second thread 9 has a fixing screw 10 screwed into it and this screw passes through an oblong hole 11 provided in the shaft 1. The long direction of the oblong hole 11 extends in the same direction as the axis of the blind hole 2.

Additionally, an adjusting screw 12 is provided in the base 2a of the blind hole 2 and this is arranged so as to be parallel to and spaced from the axis of the blind hole. This adjusting screw 12 engages in a thread 13 which is provided in the shaft. The adjusting screw 12 is additionally provided with a cylindrical centring shoulder 14 followed at its forward end by a cylindrical spigot 15. The centring shoulder 14 is a snug fit in a passage 16 provided in the shaft. The spigot 15 is a snug fit in a recess 17 provided in the cylindrical portion 3a in the support 3. This recess is advantageously provided in the region of the cylindrical portion 3a extending beyond the cylindrical portion 3b. This recess is also advantageously provided in the form of an oblong hole having its long direction extending perpendicularly to the axis of the blind hold, and in which the width b of this oblong hole, as can be seen in FIG. 2, corresponds to the diameter of the spigot 15.

If it is desired to adjust the support 3 together with the replaceable cutting insert 4 in the radial direction R it is necessary to slightly loosen the fixing screw 10. A suitable adjusting tool can be inserted in one of the hexagonal recesses 18 or 19 and this is used to rotate the adjusting screw 12. As the centring shoulder 14 abuts against the rear face 3d of the support 3, this is shifted in the direction R when the adjusting screw is rotated. It is sufficient for the amount of adjustments to lie between 0.2 to 0.5 mm. As soon as the cutting edge 4a of the replaceable cutting insert 4 has reached the desired position, the fixing screw 10 is re-tightened. This causes the support to be pressed against the side wall of the blind hole 2. At the back it is supported by means of the centring shoulder 14 on the adjusting screw 12. Additionally, the adjusting screw provides, in conjunction with the fixing screw 10, for transfer of the main cutting forces into the shaft. This transfer of the forces takes place from the cylindrical portion 3a via the spigot which is a snug fit in the recess 17 to the adjusting screw 12. The centring shoulder 14 on this then transfers the forces to the shaft 1 via the recess 16 in which it is a snug fit. This ensures that there is a high degree of safety against possible shearing off. As the adjusting screw 12 is provided with hexagonal depressions at both ends, adjustment of it can be carried out either from the front or from the back.

It is advantageous to provide the thread 9 for the fixing screw 10 in the proximity of the cylindrical portion 3a, as can be seen particularly in FIGS. 1 and 3.

In order that the user of boring tools of this type may even make the tool up himself, it is envisaged to supply the support 3 even without the replaceable cutting insert in the form of a drilling jig. In this case, the recess 17 is simply provided in the form of a cylindrical drilling. It is then possible to use this cylindrical drilling as a jig for the core drilling for the thread 13. This then simplifies exact locating of the close tolerance hole 16.

I claim:

1. In a boring tool having a shaft and at least one support which is inserted in a cylindrical blind hole in the shaft and is attached by means of a fixing screw, the support having a rear cylindrical portion with a circular cross-section adapted to fit in the blind hole and, adjoining this, a forward approximately half-cylindrical portion with an essentially semi-circular cross-section of the same diameter, the forward half-cylindrical portion having a recess for a replaceable cutting insert through which a clamping screw passes, the recess having a seating which is parallel to the top surface of the insert which passes approximately along a diameter of the shaft and abutment surfaces for the replaceable cutting insert, and in which a thread for the clamping screw is arranged perpendicularly to the seating, the improvement comprised in that the support has a second thread arranged parallel to the first thread for the clamping screw, the second thread receiving a fixing screw which is screwed from below through an oblong hole in the shaft into the support, wherein an adjusting screw is provided in the base of the blind hole and is arranged to be parallel to and displaced from the axis of the blind hole, the adjusting screw having a cylindrical centring shoulder which is a snug fit in a passage in the shaft and, adjoining the centring shoulder, a cylindrical spigot at its forward end, which is smaller in diameter than the centring shoulder and is a snug fit in a recess of the cylindrical portion of the support, and in which the rear and/or front end(s) of the adjusting screw have a depression to allow engagement of an adjusting tool.

2. A boring tool according to claim 1, wherein the recess of the cylindrical portion is arranged in the region of said cylindrical portion which extends beyond the half-cylindrical portion.

3. A boring tool according to claim 1 or 2, wherein the recess of the cylindrical portion takes the form of an oblong hole, the longitudinal direction of which extends perpendicularly to the axis of the blind hole, the oblong hole having a width corresponding to the diameter of the spigot.

4. A boring tool according to claim 1, wherein the second thread for the fixing screw is provided in the proximity of the cylindrical portion.

5. A boring tool according to claim 1, wherein the longitudinal direction of the oblong hole provided for the fixing screw extends in the direction of the axis of the blind hole.

* * * * *